[11] 3,602,577

[72] Inventor George W. Byram
  Oxon Hill, Md.
[21] Appl. No. 20,180
[22] Filed Mar. 17, 0970
[45] Patented Aug. 31, 1971
[73] Assignee The United States of America as represented by the Secretary of the Navy

[54] OPTICAL TUNNELING ACOUSTIC SURFACE WAVE LIGHT MODULATOR
23 Claims, 17 Drawing Figs.

[52] U.S. Cl. .................................................. 350/161
[51] Int. Cl. .................................................. G02f 1/28
[50] Field of Search .................................. 350/160, 161

[56] References Cited
UNITED STATES PATENTS
3,357,299  12/1967  Noble........................... 356/141

*Primary Examiner*—Ronald L. Wibert
*Assistant Examiner*—V. P. McGraw
*Attorneys*—Richard S. Sciascia, Ervin F. Johnston and John Stan ABSTRACT: An optoacoustic surface-wave device, using the principle of optical tunneling, which provides for direct amplitude modulation of a light beam by the local amplitude variation of an acoustic surface wave. The optoacoustic device uses an acoustic surface wave to locally perturb the boundary conditions at a reflecting interface, between two elements, at least one of which is a prism, and to locally modulate the light. The basic optical tunneling interaction cell includes two prisms, at least one of which is a triangular prism, separated at the interface by a small distance, for example that provided by thin-film spacers. The acoustic surface wave is propagated along one of the surfaces at the interface of the two prisms, while the light is incident at an angle, generally perpendicularly, to one of the faces of a prism.

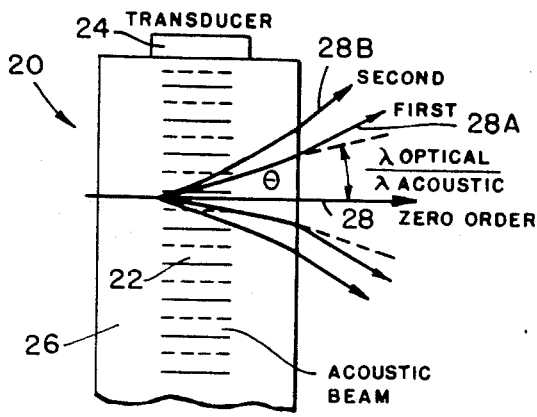
FIG. 1A
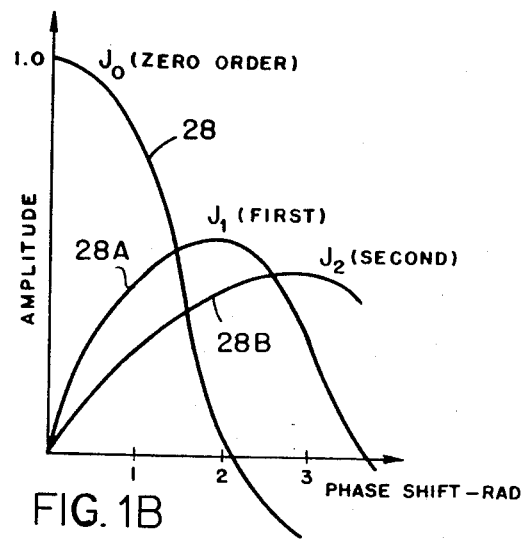
FIG. 1B
FIG. 2 (PRIOR ART)
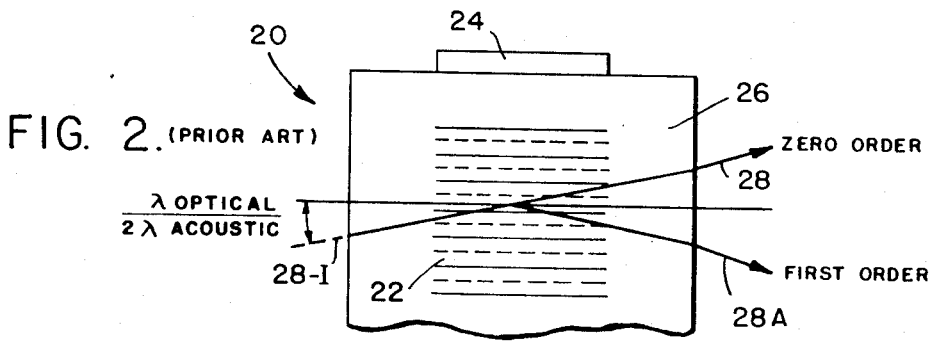
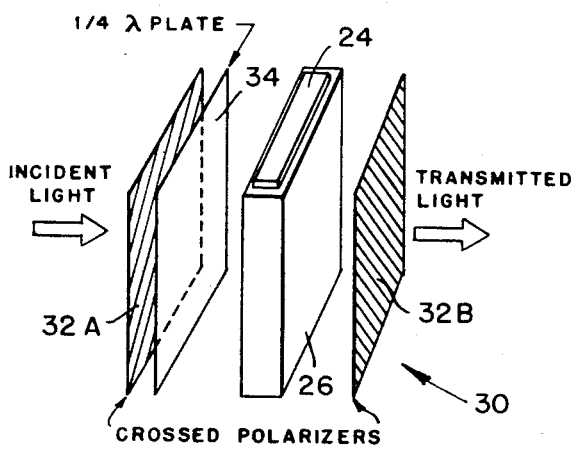
FIG. 3A
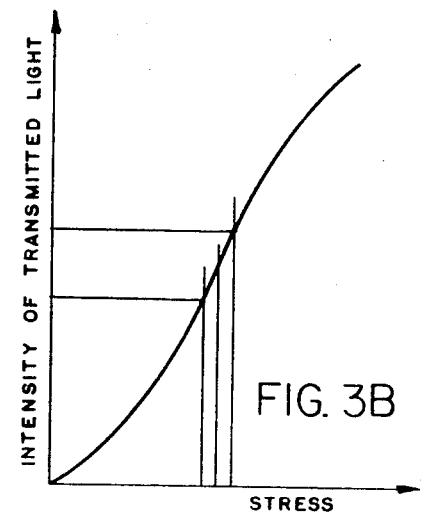
FIG. 3B
INVENTOR.
GEORGE W. BYRAM
BY ERVIN F. JOHNSTON
ATTORNEY.
JOHN STAN, AGENT.

REFLECTION: PHASE RETARDATION OF TWICE THE SURFACE DEFLECTION

TRANSMISSION: VERY SMALL PHASE RETARDATION BECAUSE THE PATH-LENGTH CHANGE AND INDEX CHANGE TEND TO CANCEL

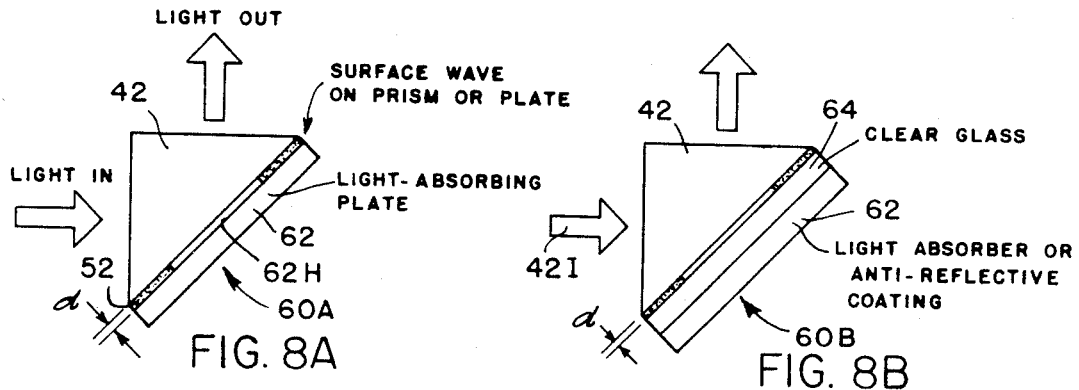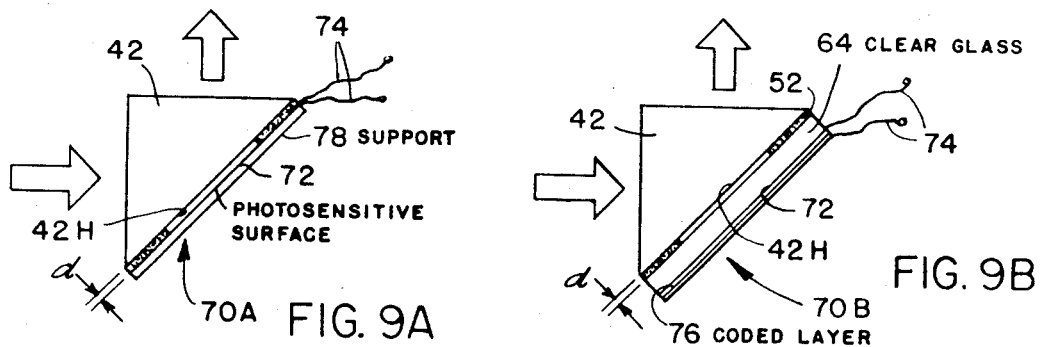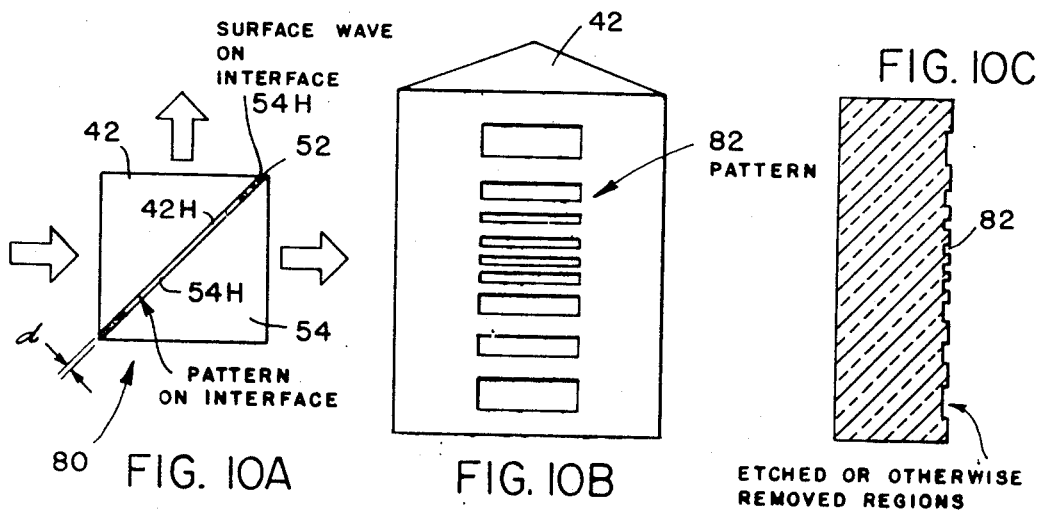

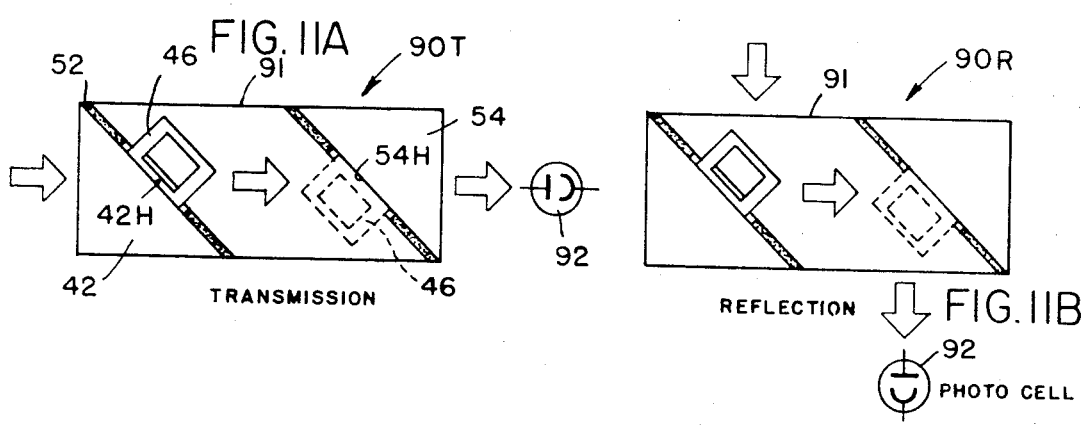
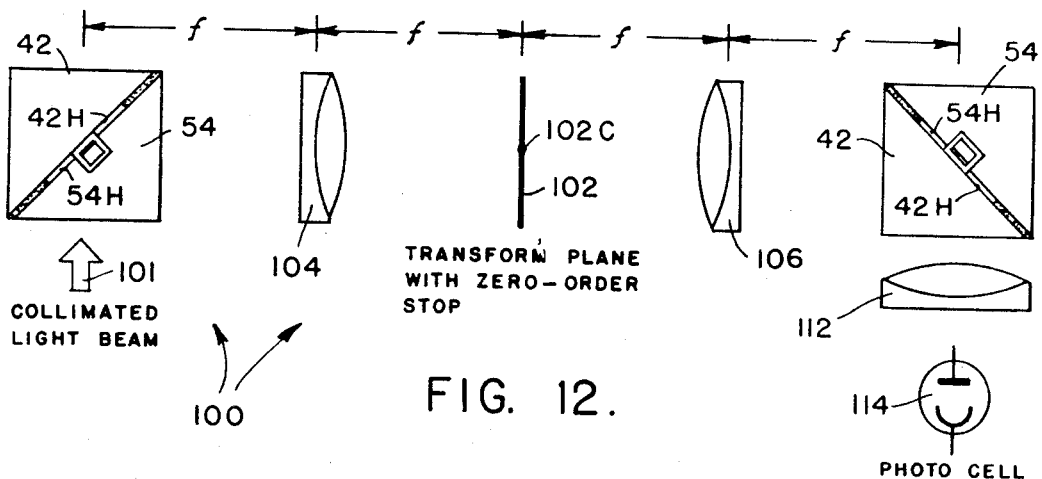
FIG. 12.
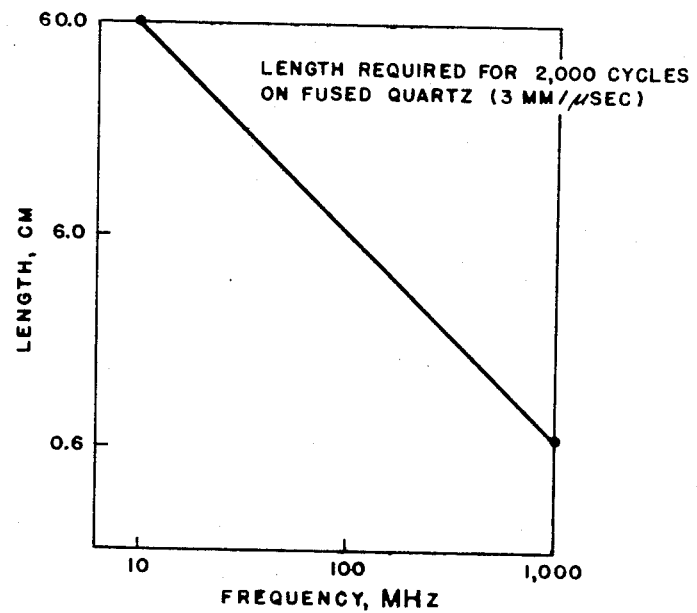
FIG. 13.
FREQUENCY DEPENDENCE OF SURFACE-WAVE-DEVICE LENGTH.

INTERSECTING REGION OF MAXIMUM OVERLAP

DEPENDENCE OF SURFACE-WAVE AMPLITUDE ON FREQUENCY & POWER DENSITY.

USE OF A DISTORTED IMAGE TO PROVIDE DOPPLER REFERENCE.

OPTICAL TUNNELING ACOUSTIC SURFACE WAVE LIGHT MODULATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to an optoacoustic device which permits the transmission or reflection of a beam of light to be locally controlled by an acoustic surface wave. Such local control permits spatial modulation of the light beam by the acoustic surface wave. This interaction forms the basis for many useful signal processing devices, since the spatial light pattern corresponds to a portion of the time history of the signal used to generate the surface wave.

Most optical signal processing devices in the prior art require a spatial input signal. In many applications, however, time signals must be processed. Time signals can be recorded on film or thermoplastic tape to provide spatial signals. This incurs a processing delay. Real time input devices usually employ interaction between light and sound in an acoustic delay line.

Currently used optoacoustic devices of this sort generally employ bulk waves, either shear or longitudinal, and modulate the light through diffraction or through strain-induced birefringence. In both cases the acoustic beam must be many acoustic wavelengths wide and thick to keep it from spreading. This violates the zero thickness condition, required for optimal results. In addition, a pure amplitude modulation is not achieved. The acoustic waves cause local variations in refractive index which correspond to phase modulation of the light. Two successive phase modulations would give a sum rather than the required product.

With respect to optoacoustic devices in the prior art utilizing surface waves, previous methods of optical interaction with an acoustic surface wave have employed direct reflection or scattering from the surface on which the wave travels. This gives a relatively weak phase modulation of the light. Hence, when amplitude modulation is required, it is necessary to separate out diffraction components whose amplitudes depend on the amplitude of the acoustic surface wave.

SUMMARY OF THE INVENTION

This invention provides apparatus for the direct amplitude modulation of a light beam by the local amplitude of an acoustic surface wave. Use of an acoustic surface wave in an optoacoustic interaction device avoids the diffraction-induced bandwidth limitations imposed by the thickness of a bulk wave. This invention also has the advantage of providing a convenient optical coupling to other types of surface wave device.

When light is totally internally reflected in a prism, the field on the outside of the prism hypotenuse is nonzero although there is no net flow of energy out of the prism there. If a second prism is placed close to the first, some energy can be extracted from this field. The light transmission is extremely sensitive to the spacing.

This invention uses an acoustic surface wave to locally perturb the boundary conditions at the reflecting interface and to locally modulate the light. Such a device provides a means whereby an input time signal can be converted to a spatial signal.

The strong dependence of transmission on spacing permits a much higher index of modulation to be achieved by the optoacoustic devices of this invention than by previous methods of optical interaction with a surface wave. It permits a higher index of modulation basically because the intervening physical mechanism of optical tunneling is exceedingly sensitive to small variations in the spacing of those two surfaces, one on each prism. Hence, a gain is obtained because the transmission of light varies very strongly with small changes in spacing and small changes in spacing is exactly what the surface wave generates.

STATEMENT OF THE OBJECTS OF INVENTION

Accordingly an object of the present invention is the provision of an optoacoustic surface wave device which embraces all of the advantages of a similarly employed optoacoustic device and minimal disadvantages.

Another object is to provide an optoacoustic surface-wave device which permits a much higher index of modulation to be achieved than by previous methods of optical interaction with a surface wave.

A further object of the invention is the provision of an optoacoustic surface-wave device which is not subject to the diffraction-induced bandwidth limitation imposed by the thickness of a bulk wave.

Other objects and many of the attendant advantages of this invention will be readily appreciated as the same becomes better understood by reference to the following detailed description, when considered in connection with the accompanying drawings, in which like reference numerals designate like parts throughout the figures thereof.

BRIEF DESCRIPTION OF THE DRAWINGS

FIG. 1 is a diagrammatic view and a graph of corresponding Bessel function curves of a bulk-type optoacoustic device of the prior art which operates on the principle of the Raman-Nath, or Debye-Sears, diffraction.

FIG. 2 is a diagrammatic view of a bulk-type optoacoustic device of the prior art which functions on the principle of Bragg diffraction.

FIG. 3 is a diagrammatic view of a bulk-type optoacoustic device, also of the prior art, wherein light modulation occurs through the agency of strain-induced birefringence, and the corresponding curve of intensity of transmitted light versus stress.

FIG. 8 is a pair of side views of an optoacoustic surface-wave device utilizing a prism and a light-absorbing plate.

FIG. 9 is a pair of side views of an optoacoustic surface-wave device utilizing a prism and a photosensitive surface.

FIG. 10 shows diagrammatic views of an optoacoustic device utilizing two prisms on the interface of at least one of which is a coded pattern.

FIG. 11 is a side view of correlator structures consisting of three prisms which do not use imaging optics.

FIG. 12 shows a diagrammatic side view of the use of two optical tunneling cells and an afocal optical system in a correlator.

FIG. 13 is a graph which shows the frequency dependence of the length of a surface wave device.

MORE DETAILED DESCRIPTION OF THE PRIOR ART

Figure 4A:
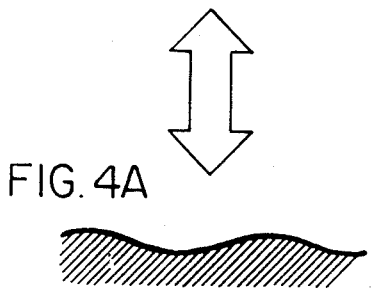
FIG. 4 is a pair of partial cross-sectional views showing the phase modulation at the surface of an optoacoustic device by an acoustic surface wave of reflected light and of transmitted light. This is also known in the prior art.
Figure 4B:
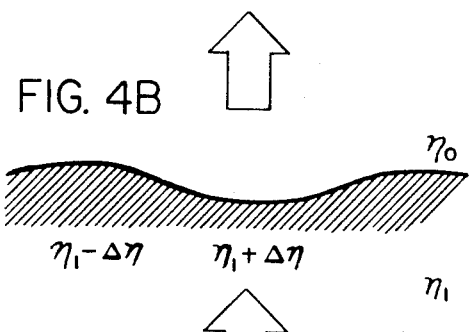

Typical prior art devices are shown in FIGS. 1 through 4. Performance limitations of these devices arise mainly from the thickness of the bulk wave.

In FIG. 1 there is shown an embodiment of a prior art optoacoustic device 20 wherein the acoustic wave 22, shown as a series of crests and troughs, generated by transducer 24 in a transparent solid 26 causes refractive index variations in the transparent delay line. This forms a phase grating which diffracts the light into sidebands about the undiffracted or zero order 28. As shown in FIG. 1B, the amplitudes of the first and second diffracted orders 28A and 28B, which correspond to the first and second order Bessel functions, are proportional to the amplitude of the acoustic beam 22. The angle $\theta$ in radians is equal to the optical wavelength divided by the acoustic wavelength for the first-order diffraction term 28A. The type of diffraction shown in FIG. 1 is the Raman-Nath, or Debye-Sears diffraction.

In the ideal case it is desirable that the modulating regions, that is, the regions in which light is being amplitude-modulated by the acoustic wave, be in contact to minimize diffraction spreading of light between them. In the case of a phase-modulating region, however, it is necessary to use that spreading to separate out desired amplitude modulated components. For small phase changes only the first order sidebands 28A will be important. One or both of these two sidebands 28A may be selected as the output light component whose amplitude is proportional to sound intensity. This selection is possible by spatial filtering since the diffracted components travel in different directions. Care must be used, however, to permit a wide enough range of angle to cover the band of input frequencies. If this spatial filtering is combined with optics to image the first delay line onto the second, the effect of spreading between the two delay lines may be eliminated. This increases the size of the system, however. It can also force design compromises to accommodate the field of view and resolving power of the lenses.

Other problems arise at high frequencies. The spread of the light sidebands in the thickness of the acoustic beam may cause them to spread into regions in which the refractive index changes cancel. This will occur if the width of the acoustic beam is greater than $$\lambda^2_{acous}\ tic/4\lambda$$

This width marks the upper boundary of the Debye-Sears or Raman-Nath region. For wider acoustic beams, the sidebands eventually disappear through destructive interference. This is a serious limitation since it corresponds in fused quartz, for an acoustic beam 25 acoustic wavelengths thick, to an upper frequency limit of 60 MHz. for shear waves and 30 MHz. for longitudinal waves. Alternatively, it implies that a frequency of 100 MHz., the beam could only be 15 wavelengths thick, or less than half a millimeter. Since a narrow beam will spread more rapidly, this limits the total length of sound path that can be observed, and hence the time-bandwidth product of the device.

An exception to the limitation on the total length of sound path that can be observed arises if the Bragg condition
angle of incidence=$\lambda_{optical}/2\lambda_{acoustic}$
is met, as is shown in the embodiment 20 shown in FIG. 2.

In this case, one sideband is constructively reinforced and the rest vanish. This avoids the thickness constrain on the beam. Unfortunately, however, the required angle is a function of signal frequency. For a fixed geometry this again imposes a bandwidth limitation.

In FIG. 2, the lower line, shown by reference numeral 28—1, represents a beam of light. The horizontal line is used to define the Bragg angle.

In some cases, Bragg devices have been used over a wider range by using a phased acoustic transducer array to tilt the sound beam and preserve the Bragg condition. This becomes rather awkward if two successive optical cells are required.

Several other techniques can be used to derive amplitude terms. A reference beam can be introduced, as in an interferometer, or, as is shown in the embodiment 30 shown in FIG. 3, the strain-induced birefringence can be observed between crossed polarizers 32A and 32B. Interfermetric methods present stability problems. Birefringence methods have strong advantages in suitable materials since the crossed polarizers 32A and 32B can favor the desired component by a factor of up to $10^5$ over the undesired components. The quarter-wave plate 34 is necessary to bias the operating point away from the origin to a more nearly linear portion of the curve shown in FIG. 3B, to avoid frequency doubling due to the even function of the curve at the origin. FIG. 3B shows the variation of light transmitted through both polarizers 32A and 32B as a function of the intensity in prism 26.

These techniques do not, however, escape the diffraction problems introduced by the thickness of the acoustic beam. Although devices based on strain-induced birefringence as in the embodiment 30 shown in FIG. 3 do not depend on diffraction to separate out amplitude-modulated components, they are subject to the same diffraction limitations as the other bulk wave devices shown in FIGS. 1 and 2.

The prior art thus far discussed related to embodiments wherein the acoustic wave was a bulk-type wave, either longitudinal or shear.

Since many of the problems associated with bulk waves arises from their inherent thickness, it is reasonable to look at surface waves. Surface, or Raleigh waves, exist only within one or two acoustic wavelengths of the surface on which they travel. Raleigh waves are even a bit slower than shear waves and hence permit a high information storage density. They are nondispersive and are not very rapidly attenuated.

In FIG. 4A, wherein there is shown phase-modulation produced by light reflected from the surface of a body, the modulation occurs as a consequence of the slightly different path length that the light reflected from a high point of the surface travels as compared to one reflected from a low point of the surface. The presence of the surface wave controls the height of local regions of the surface.

Similarly, in the transmission curve 4B, there are different path lengths, but here the effect is also complicated by the presence of changes in the refractive index, which change the apparent length of the light path as seen by the light, and tend, therefore, to cancel almost exactly the true distance changes. This is so because the path length in the denser material is shorter in the valleys or troughs of the surface wave.

These difficulties presently limit the usefulness of acoustic surface waves in optoacoustic devices.

DESCRIPTION OF THE PREFERRED EMBODIMENTS

Figure 5A:
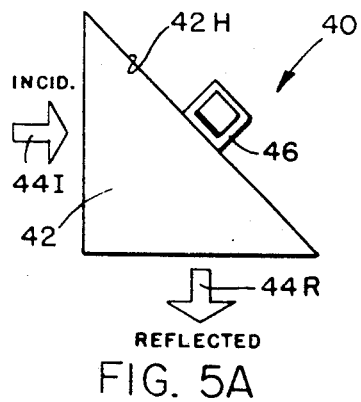
FIG. 5 is a pair of diagrammatic views of a partial embodiment of the basic optical tunneling interaction cell, common to practically all of the embodiments, to more clearly show the parameters involved.
Figure 5B:
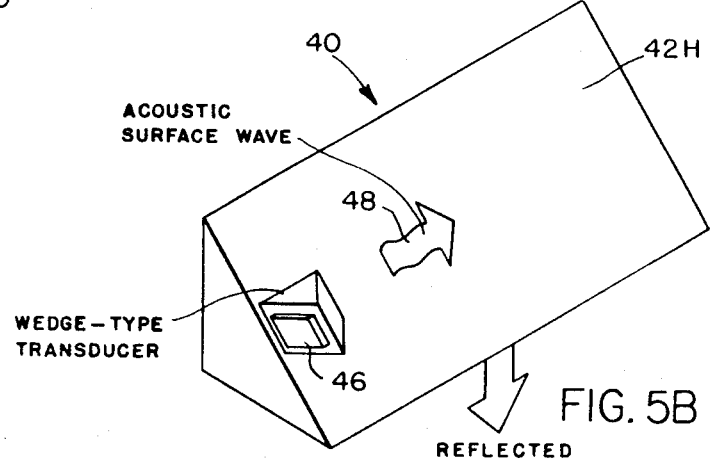

Referring now to the drawings which relate to embodiments of the subject invention, and wherein like reference numerals designate like or corresponding parts throughout the several views, there is shown in FIG. 5 a simplified, incomplete, embodiment, shown only to more clearly define some of the parameters, since it is common to most of the embodiments. The device 40 comprises a transparent prism 42 having a triangular cross section, adaptable for receiving a beam of light in the plane of the cross section. Means, such as a wedge-type transducer 46, produce an acoustic surface wave 48 on the largest surface 42H of the prism 42, which surface is perpendicular to the cross section, with the result that any incident beam of light 44I on such surface is modulated by the acoustic surface wave. Usually the beam of light would be of rectangular cross section with width equal to the width of the surface wave and length corresponding to the time interval being processed. Projection of the light beam on the surface wave at an oblique angle would, of course, change these relations. Centering and a match in projected dimensions is helpful but not absolutely essential. Exact parameters would usually be based on the specific device being constructed and on external constraints.

The fact that the light is being totally internally reflected at that surface, and in fact that surface is actually being distorted by the presence of the acoustic surface wave, does provide a convenient way for getting at the surface wave. Generally, the cross section of the prism 42 is an isosceles right triangle, that is, the acute angles are both 45°.

Discussing now what happens from the standpoint of energy in the simplified embodiment shown in FIG. 5, assume an ordinary glass prism 42 through which passes a beam of light 44I that is being totally internally reflected in the prism. If the diffraction losses that occur due to the finite size of the prism are neglected, that is, those due to the finite aperture, one finds that all of the energy that goes into the prism is totally internally reflected and comes out the other regular face of the prism. However, if a very sensitive probe or energy detection scheme is placed next to the hypotenuse 42H on the outside of the prism 42 out in the air or a vacuum surrounding the prism it will be found that there actually does exist energy in that region. However, there is no net flow of energy over and beyond diffraction losses out of the prism 42 at that point and so it eventually finds its way back into the prism after propagating along the surface for a very short distance, and in fact the difference in the distance along the hypotenuse which the energy travels compared to the total internal reflection in a glass surface and from an aluminized film on the same surface is well known.

From an electromagnetic field theory point of view, a critical point determining the flow of energy in that region is that although the Poynting vector, which is used in electromagnetic field theory as a measure of the flow of energy, is nonzero in that region, its net time average is zero in the direction out of the hypotenuse 42H and hence there is no net flow of energy out of the prism 42, there is just energy flowing back and forth in a vdry loc[l rdfion. That is to say, instantaneously the Poynting vector is not zero but average-wise it is.

With respect to the nature of the beam of light, any type of light may be used, monochromatic or not, coherent or incoherent, and need not have a specific polarization. An in coherent system is linear in intensity. A coherent system is linear in complex amplitude. Photodetectors give an output proportional to intensity. Hence, a coherent system would have an output proportional to the square of the desired correlation function. The use of coherent light is essential in many of the diffraction and spatial filtering techniques. In general, the more specific the nature of the input light—coherent, monochromatic, polarized, etc.,—the easier it is to detect a portion of it that has been modified by some interaction.

Figure 6A:
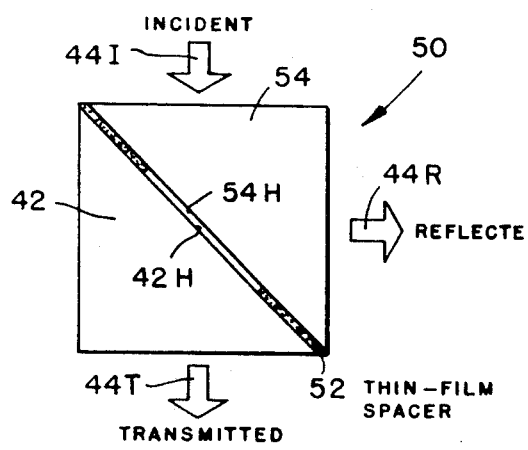
FIG. 6 is a similar pair of views using two prisms, which would be embodied in a practical embodiment.

FIG. 6 shows a practical embodiment 50 wherein occurs an intermediate interaction which is more sensitive to the surface wave 46 than the prior art embodiments. Since Raleigh waves are out on the surface, it is reasonable to expect that additional types of interaction should be possible.

One such interaction is optical tunneling. When a beam of light 44I, incident on one of the lateral faces of prism 54, is totally internally reflected in the prism, the field on the outside of the hypotenuse 54H is nonzero although there is not net flow of energy out of the prism there. If a second prism 42 is placed adjacent to, but separated from, the first one 54, the two prisms 42 and 54 forming an optical interaction cell, some energy will penetrate the boundary 54H and appear in the second prism. The coupling between the two prisms 42 and 54 is extremely sensitive to the spacing.

The optoacoustic device 50 further comprises a thin-film spacer 52, which serves as a means for separating the two prisms 42 and 54, and is disposed on the hypotenuse surface of either one of the prisms, 42. The two adjacent prism surfaces 42H and 54H constitute an interface.

With respect to the type of material of which prisms 42 and 54 are composed, as well as the other prisms to be described hereinbelow upon which a surface wave is generated, they do not have to be crystalline, and in some applications it is desirable that they not be, so that their properties in different directions will not be different. However, they can be crystalline in many cases. Essentially the only requirements on them is that they be transparent to the wavelengths that are used optically and that they be able to take a reasonable optical surface finish and be rigid enough so that desired spacings can be achieved without having a prism sagging.

Optical glass, flint glass, crown glass, in fact one might even be able to select glass which had a relatively low shear modulus and hence make it easier to generate a large surface wave. However, a little rigidity might be sacrificed in this arrangement.

With respect to the means for separating the two prisms 42 and 54, this could consist of a spacer comprising a thin film 52 of aluminum, gold or any material that may be deposited in some manner, by vacuum, electrically, etc. The amount of separation required is approximately one-tenth of any optical wavelength of the light to be used. Alternately the separation could be provided by making either one or both hypotenuse surfaces 42H and 54H slightly concave, for example by providing one or both of them with a cylindrical radius.

The wedge-type transducer 46 is old in the art, and generally consists of a flat rectangular plate 46T, both sides of which are electroded, and mounted on a triangular prism 46P. The prism 46P must be of such material that its longitudinal sound velocity would have to be such as to permit the projection of the longitudinal wave on its bottom surface to match, cycle for cycle, the surface wave propagating inward on the base surface under it, for example, surface 42H in FIGS. 5 and 6. Typically, the transducer plate may be a quartz crystal, or a lithium niobate crystal mounted on a prism of thallio-bromo-iodide.

Typically, a photocell or other type of photodetector, not shown in FIG. 6 (but refer to FIGS. 11 and 12), would be disposed at a place where the reflected or transmitted, but usually reflected, light beam emerged from the interaction cell. In general, if an electrical output is desired from the device, and the output from the device is an optical output, then a photodetector of some kind must be used to perform the conversion.

In some relatively rare number of cases, an operator might be able to look at the output of the device and make some judgments about the output, for example about relative intensities.

The two prisms 42 and 54 may be held together in various ways, for example by friction or by clamps (not shown). Clamps could be used for holding together the prism and an adjacent optical interaction element for other embodiments shown hereinbelow.

Whereas the embodiment just discussed and all of the embodiments herein illustrated have as a key element a triangular prism, neither element need be triangular. The important feature is that the geometrical configuration be such that an interaction between the beam of light and the surface wave may take place. A nontriangular prismatic configuration, for example could include a wedge-type transducer mounted on the flat surface of a half-cylinder in such a way as to generate a surface wave on the flat surface in a direction perpendicular to the axis of the half-cylinder. The light enters the prism radially inwardly so as to intersect the propagating surface wave, and is reflected off the flat surface radially outwardly.

Adjacent to the wedge-type transducer and spaced a proper distance above the half-cylinder is a truncated half-cylinder having, for all practical purposes, the same axis as the half-cylinder and forming an interaction element with it. The incident light beam, intersecting the common axis of the two half-cylinders, is transmitted through the truncated half-cylinder radially outwardly. The modulated transmitted wave may be used, although generally it would be the modulated reflected wave which would be used.

A nonprismatic configuration can be readily derived from the just-described embodiment by replacing the half-cylinder by a half-sphere and the truncated half-cylinder by a truncated half-sphere. The interaction process would be identical in both embodiments.

Figure 6B:
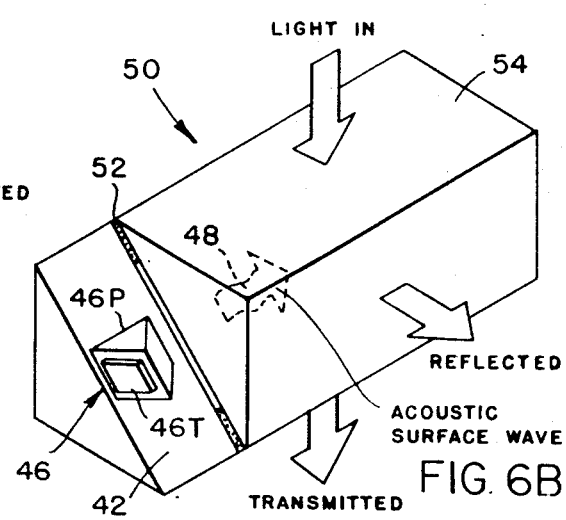

If an acoustic surface wave 48 generated by transducer 46 (for clarity, not shown in FIG. 6A), is made to propagate down the interface on one surface, as shown in FIG. 6B, it will cause local changes in spacing between the two prisms 42 and 54. These changes in spacing will then amplitude modulate the light.

Figure 7:
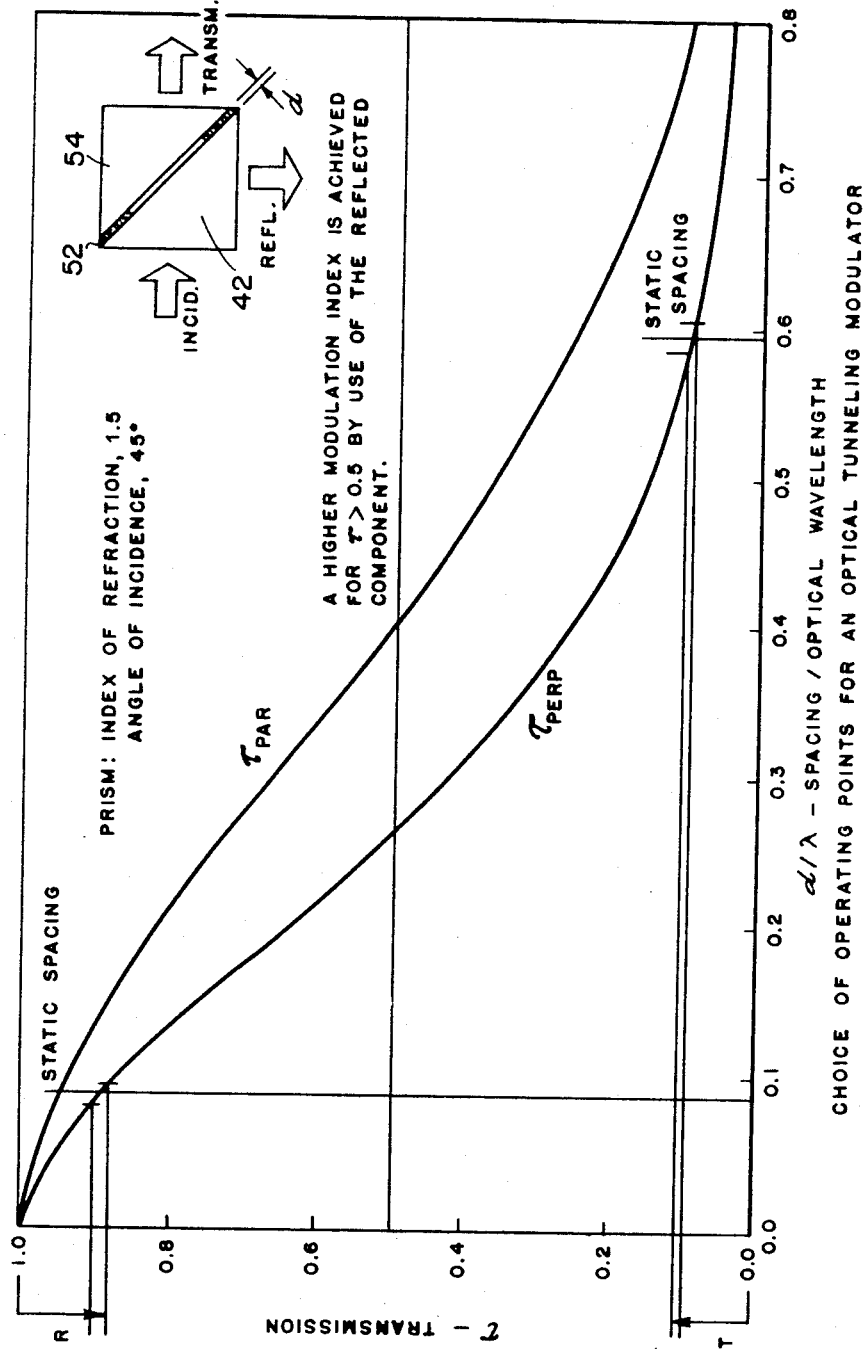
FIG. 7 is a pair of curves which show the relative amount of optical tunneling as a function of prism separation (for both the transmitted light and the reflected light), with an indication of how a suitable operating point may be chosen.

The curves of transmission $\tau$ versus spacing for each of the two polarization components $\tau_{perp}$ and $\tau_{par}$, shown in FIG. 7 permit choosing a suitable operating point. The modulation index is a function of both the static spacing and the surface motion which may be achieved. The modulation index is the ratio of the varying component to the static component. The varying component for a given spacing and surface wave amplitude is the same since the light is either reflected or transmitted. Hence the ratio of varying component is larger for the smaller fixed, or static, component. Since it is generally desirable that the modulated component be as large as possible as percentage of the static component, one would choose the reflected component if the static transmission is greater than 50 percent and the transmitted component if it is less.

As an experiment to determine what range of operating points would be possible, two prisms were pressed together at their reflecting surfaces to form a beam splitter. As the pressure holding them together was increased, the light path changed from almost total reflection to almost total transmission. The prisms used were of very low quality and no particular pains were taken to exclude dust. It is reasonable to expect that higher quality prisms assembled in a clean area with thin film spacers will be able to achieve very small static spacing.

The curves of transmission $\tau$ as a function of spacing, as shown in FIG. 7, decrease from 100 percent for zero spacing to a few percent for a spacing of one-optical wavelength. In this figure, the $\tau$'s are equal to the transmission, and they vary from 0 to 1. In the case of zero, no light transmission occurs; in the case of $\tau$ equal to one, all of the light is transmitted. The upper curve labeled $\tau_{perp}$ is for the perpendicular polarization component. It is to be noted that the light is either transmitted or reflected, i.e., the total light is constant, hence both curves show the transmitted component —the remainder is reflected. There are two curves in the plot because the parallel and perpendicular polarization components behave slightly differently.

The term "static", as used in FIG. 7, refers to the fixed physical spacing of the two glass surfaces in the absence of a surface wave. This is the reference point about which the surface wave then varies the spacing.

The presence of a surface wave perturbs the spacing about the operating points on the transmission curves. As shown in FIG. 7, it is preferable, but not essential, to use the transmitted component when the static transmission is less than 50 percent, and to use the reflected component when the transmission is greater than 50 percent. This ensures that the modulated component is as large as possible a percentage of the total light flux.

Discussing now how operating parameters may be chosen by examining FIG. 7, the letters T and R represent two possible cases of using one of these devices, both involving the perpendicular polarization component. In the first case labeled R, it will be noticed that there is a vertical line in that figure that comes down to the abscissa axis at about a little short of the 0.1 point for abscissa $d/\tau$. If a static spacing a little less or in the neighborhood, say, of a 10 th of a wavelength can be achieved, in this case it is better to use the reflected component of light rather than the transmitted component of light. The varying component of light corresponds to the vertical spacing between the two horizontal lines, the lower one of which comes up to the point of the arrow marked R, having a $\tau$ value of approximately 0.88 and the upper one having a $\tau$ value of approximately 0.9.

The important thing to be considered is that the varying component of light is going to depend on two things. First it is going to depend on the portion of the curve on which one is operating. That is determined by the static spacing. Second, it is going to depend on how big a surface wave can be generated, i.e., how much that static spacing is going to change where the surface wave is. Now that change in static spacing for any given surface wave is going to appear equally in both the transmitted and reflected components alike, but with a small spacing, the reflected component of light is much smaller than the transmitted component of light. Since what one is interested in is the percentage change, since the change is constant for the case where the reflected component is smaller, one uses it so that the net change is a greater portion of what light is going through.

Now discussing the other case, dealing with the letter T in FIG. 7, where only a fairly long static spacing can be achieved then the static transmitted portion of light is smaller than the static reflected portion, but the change, or varying component, shows up equally in both, and it is better to use the transmitted part as the light output of the cell, so that the net change will be a greater proportion of the total light output.

The horizontal line right through the middle of the figure, that divides it in two, above and below, and having a $\tau$ value of 0.5, is essentially the boundary line that determines whether it is better to use the reflected component or the transmitted component. Now, in borderline cases one could use either, but this line determines where one gets the greater percentage change, i.e., smallest fixed component. The component then that one would choose corresponds to where the $\tau_{par}$ or $\tau_{perp}$ lines are crossed for the spacing used. When crossing them above the $T=0.5$ value, it is better to use a reflected component, and when crossing them below the 0.5 value, it is better to use the transmitted component. This is a design option, but one could do it the other way.

Similar diagrams could be made using the parallel polarization component of light. The perpendicular component was chosen simply as an example. One could use either or both. Unpolarized light would have a curve somewhere in between the two curves shown in FIG. 7.

In another case in which the reflected component of light is used, an embodiment 60A can be used in which the second prism 54 of FIG. 6 is replaced by a light-absorbing surface 62, as shown in FIG. 8A. Surface 62 need not necessarily be a dark glass surface since a dark surface can be highly reflective. What is desired is to prevent light 42I entering the prism 42 from leaving it. There are two ways this can be done.

One way is to have a light-absorbing plate 62, as shown in FIG. 8A, which serves two purposes: Its interface surface 62H serves the same function as surface 42H in FIG. 6. Its structure is such that the light which does manage to penetrate into it cannot escape. Its composition could be such that it is clear at the interface 62H, but gradually gets darker and darker as one moves away from this surface. This is a common form of light absorber.

It is also permissible, and often convenient, to separate the absorber 62 from the prism 42 hypotenuse with a layer of glass 64, separated by a distance $d$, which may represent the thickness of a spacer 52, from the glass prism 42, to result in the embodiment 60B shown in FIG. 8B. The absorber 62 may be replaced by an antireflection coating on the glass 64.

In cases in which the transmitted component is used and an integration over the net output light flux is desired, an embodiment 70A (see FIG. 9A) using a photosensitive surface 72, also separated by the distance $d$ from the glass prism 42, can be used. The photosensitive surface 72 would be coded in some manner to be able to detect the spatial modulation of the light beam, that is to locally detect the presence of a surface wave. The coding enables the photosensitive surface to make a distinction between various portions of its surface. The leads 74 connect to two regions of surface 72 and to an amplifier (not shown), and would enable detection of light variations between two regions. In the more general case, there would be many terminals, not just two as shown in FIG. 9.

A support plate 78 is generally required to give mechanical support to the photosensitive surface 72.

The detection takes place in the following manner. When the surface wave propagates along the surface, different regions of the surface correspond to different portions of the time history of the signal that caused the surface wave, since the optoacoustic device 70A and 70B is a delay line. Assuming the presence of only two very small adjacent photosensitive areas, separated from each other, on photosensitive surface 72, one could observe, for example, whether light variations happen simultaneously or not, at the particular separation of the two areas.

By increasing the number of photosensitive areas, and therefore the number of leads 74, with a lead 74 to each area, it is possible to ascertain more and more information about the nature of the surface wave. One of the leads 74 may be a ground lead and the other a "hot" lead, or a floating ground system may be used with no grounded lead. With multiple leads there is a similar choice of grounding one lead and referencing the other leads to it, or having all leads floating.

It is not necessary to have one amplifier (not shown) for each of the photosensitive areas. There could be a number of photosensitive areas all connected in parallel. In the most general case, there would be a separate wire for each distinct photosensitive area, and these would be connected to separate amplifiers. As photosensitive areas of this type are generally made, a region of photosensitive material is deposited, which region is then electroded as desired, in order to be able to make distinctions as to where and with what intensity light was coming through.

The optoacoustic device, as shown in FIG. 9B, may further comprise a pane of clear glass 64 disposed between the prism 42 and the photosensitive surface 72, for clarity shown separated from the clear glass plate 64. The pane 64 is used since it might be difficult to make a photosensitive surface that is flat to required tolerances, even if a thin film were deposited on a flat glass surface.

In the most general case of FIG. 9B, there would be a coded layer between the photosensitive surface 72 and the clear glass 64. The coded layer could have specific areas which are opaque, reflective, absorbing or photochromic.

The different relative positions of the photosensitive surface 72 with respect to the interface at 42H, makes the form of interaction in FIGS. 9A and 9B different. The interaction in the embodiment 70B of FIG. 9B with the intervening glass is shown by the parallel and perpendicular components $\tau_{par}$ and $\tau_{perp}$ in FIG. 7.

Curves for the light components shown in FIG. 9A would be similar to those shown in FIG. 7, but would be more closely related to an exponential curve, because the boundary conditions are modified by the absence of the adjacent prism.

It is to be noted that the transducers are not shown in FIGS. 8 and 9, so as to not unnecessarily clutter up the drawings. In each instance, a transducer would be so positioned as to generate a surface wave on the hypotenuse surface.

The distance $d$ in all the figures designates the thickness of the spacer 52, and, for clarity, is greatly enlarged.

Before discussing the embodiments which perform a correlation function, and the manner in which they perform this function, a brief review of the theory involved should prove useful.

A correlator is a special purpose computer which solves integrals of the form $$c(\tau) = \int_0^T g(t-\tau)dt,$$

where $f(t)$ and $g(t)$ are input time signals and $c(\tau)$ is the output. Such a computer can realize the operations of convolution, correlation, pulse compression and matched filtering.

The major advantage of special purpose hardware for such operations arises from the ability to operate in parallel on an entire T-second interval. This permits a great increase in processing speed over conventional techniques.

Five requirements must be met to implement a correlation integral. These are:

First, parallel access to T seconds of the past history of the two input time signals $f(t)$ and $g(t)$ is needed. This imposes a memory requirement on the computer. This requirement can be met by modulating a sound wave with each signal. A T-second long portion of each wave then stores the required information.

Second, corresponding portions of the two functions must be multiplied. This product can be formed by successively amplitude-modulating a light beam by the amplitude of corresponding portions of the two sound waves. The requirement for dealing with corresponding portions arises from the fact that the operations of multiplication and integration cannot be interchanged here.

Third, $\tau$ must be varied. This can be done quite easily by causing the two sound waves to propagate in opposite directions. The two signals will then scan past each other and all values of $\tau$ will occur.

Fourth, one needs to integrate over these products. This can be done by collecting the light which has interacted with both waves onto a photocell. The photocell signal is then $c(\tau)$. At this point a convolution integral has been realized.

The fifth requirement arises from the opposite-direction propagation that was used to secure a scan in $\tau$. If a correlation integral is desired rather than a convolution, $g(t)$ must be reversed in time. This operation can be performed externally on T-second long pieces of $g(t)$ by scanning a 2T-long serial memory at twice the rate of signal propagation through the memory. An alternate procedure, if $g(t)$ were the reference signal, would be to generate $g(-t)$ directly.

All of these requirements are relatively easy to meet except the product requirement. Difficulty at this point is the single major factor limiting the performance of most optoacoustic correlators.

In a wide class of useful devices, such as matched filters, it is desired to convolve a signal with some reference function. This operation can conveniently be performed by the use of an embodiment 80, as shown in FIG. 10, having a pattern 82, which may be considered a coded pattern, at either of the interfaces 42H or 54H, but not both, to represent the reference function. The pattern 82, of etched or otherwise removed areas, in this case is on surface 42H. When one etched surface is used to code one prism 42, the surface wave, and hence the transducer generating it, must be put on the other prism 54. A high frequency surface wave cannot propagate on a rough etched surface. It would be severely reflected, attenuated and scattered.

In addition to removal by etching, discontinuities forming the pattern 82 may be introduced by making some areas more opaque, highly reflective, highly absorbing, photosensitive than other areas. In the photosensitive case, the individual photosensitive regions would be electroded, and the signals brought out differentially from adjacent areas, or in the most general case, made separately accessible. In a more complex embodiment 80, a photograph may be interlaid at the photosensitive surface at the interface, on either surface 42H or 54H.

In some cases, an alterable reference function can be achieved by the use of a photochromic layer at the interface. The desired pattern is then exposed onto this layer. Similar techniques can be used with any other image storage medium which can be applied on or adjacent to the interface.

A correlator or convolver may not necessarily require a reference pattern. A simple realization of such a device is shown in the two embodiments 90T and 90R of FIG. 11. The technique based on two reflections, shown in FIG. 11B, is more useful in most cases because a higher modulation index can be achieved in reflection. It is not necessary that both modulations use the same component. One could be reflection and the other transmission.

FIG. 11 shows two embodiments 90T and 90R consisting of the two prisms 42 and 54 of FIG. 6, with thin-film spacers 52 disposed on the hypotenuse surfaces 42H and 54H of the prisms. A third prisms 91, having a cross section in the shape of a parallelogram, two of whose sides are parallel to the hypotenuse 42H or 54H of either prism, is disposed between the two thin-film spacers 52. A photocell 92 demodulates the modulated emerging light. The photocell 92 produces an electrical output signal which varies in the same manner as the intensity of the light.

Structures of this type would generally be limited to relatively low frequencies by two factors. First, larger surface waves can be achieved at low frequencies. Second, the influence of diffraction spreading between the two waves becomes more serious at high frequencies.

Discussing now what happens from a mathematical standpoint in FIG. 11, the correlator 90T or 90R is a physical device which implements a correlation function or a measure of the linear relationship of two input signals. The two transducers 46 cause surface waves traveling in opposite directions on the two interfaces. The left transducer in both FIGS. 11A and 11B produces a surface wave which is directed into the plane of the paper and the right transducer produces a surface wave which is directed out of the plane of the paper. As was true in the preceding figures, the direction of the light beam is shown by the arrows. Light is transmitted through both interfaces 42H and 54H as shown in FIG. 11A, or light is reflected off both interfaces, as shown in FIG. 11B. Since the transmission of light is locally controlled by the amplitude of the surface wave generated at the interface, the light intensity is multiplies by the amplitude of one surface wave and then by the amplitude of the second surface wave, so that the net light beam, shown by the emerging arrows, which goes through both interfaces at 42H and 54H, as shown in FIG. 11A, has been multiplied by both and therefore contains a term proportional to their product.

All of this light is then collected by a photodetector 92, which performs an integration. The integral of a product is a convolution type integral, and if the input signals are defined correctly in time, there is then a correlation. On the other hand, the operation may result in a convolution. The only difference between the two functions, the correlation and the convolution function is a matter of definition of the time axes, whether both signals, in this instance, surface waves, propagate in the same direction, or whether one is reversed in time with respect to the other.

The structure 90T or 90R as shown in FIG. 11 is actually a device for performing a convolution function, since, when the surface waves are caused to travel in opposite directions to cause a scan in $\tau$, this is equivalent to inverting one of them in time. However, if one of the surface wave signals is reversed in time, then the net output of the device would be a correlation function rather than a convolution.

A correlation function may also be obtained by choosing a material for one of the prisms 42 or 54 to be such that the velocity of an acoustic wave is considerably greater in one of the prisms than for the other, where both travel in the same direction, although with present day materials this is difficult to achieve. Besides, there would be the disadvantage that the prisms would be extremely long, and the modulating frequencies would be translated downward, due to the relatively low rate at which one signal overtakes the other.

A more complex form which avoids the problem of diffraction spreading of light between the modulating regions, and which permits undesired undiffracted components to be removed by spatial filtering, is shown in the embodiment 100 in FIG. 12. To help remove some of the undiffracted light and to control the spreading between the cells, imaging optics and spatial filtering are introduced, as shown in this figure. The interaction regions, at the interfaces, 42H and 54H, between the two pairs of prisms, are at an angle of about 45° in the light path. To form a sharp image of one region onto the other it is necessary to use an afocal optical system. The two lenses 104 and 106 form the afocal optical system which images one tiled plane at the left interaction cell onto the other tilted plane at the right interaction cell. A magnification of unity must be chosen since the magnification of an optical system in depth is the square of its lateral magnification.

The prisms 42 and 54 need not be at 45°, but this is generally the most convenient angle. One criterion which must be met for optimum results is that both imaging planes, when extended, must intersect in a line which is in the plane through the center of the optical system and perpendicular to its axis.

This system has an added advantage in that the plane 102 midway between its two lenses 104 and 106 corresponds to a Fourier transform plane. A small opaque spot 102C in the center of this plane 102 will block most of the zero order term since the undiffracted light is brought to a focus there. This point corresponds to zero spatial frequency or to the DC level in an ordinary signal.

Tracing a collimated beam of light from arrow 101, through the left prism 54 to the interface at surface 54H the reflected beam is then converged to a focus by lens 104 onto transform plane 102 at point 102C. At point 102C is placed a small opaque circular object, having a size in the order of one-sixteenth inch, on the surface of a thin glass slide, for example, which would prevent the passage of any unmodulated light. The center point 102C should be as small as possible, consistent with the requirement that all undiffracted light is blocked out by the center point.

However, the acoustic surface wave generated at the interface of the left interaction cell, into the plane of the page, modulates the collimated beam of light, causing some diffraction, which causes some of the light to exit prism 54 of the left interaction cell at slightly different angles. This light is imaged by lens 104 into a slightly different portion of the transform plane not containing point 102C. The focused beam of light is thus able to continue into lens 106 and then into the right interaction cell.

If desired, a more general type of spatial filtering can be used by control of light transmission over the entire transform plane rather than just the center spot 102C. This could be done for example, by having at the position of the transform plane 102 a plate consisting of regions of varying opacity from one region to the next. The center spot 102C could be included to prevent passage of light corresponding to light of the zero-order term, or could be excluded, depending upon the type of transmitted light desired for a specific application. A photographic transparency could be placed at the transform plane 102, representing the desired amplitude transmission function. A film could be deposited at the plane 102 in order to control the phase of the light going through. This would constitute a more general form of spatial filtering.

One of the more useful types is that shown, in FIG. 12, the zero-order stop which helps get rid of some of the unwanted light.

Afocal optical systems per se are not new, but the specific application and embodiment shown in FIG. 12, utilizing a pair of optical interaction cells, is believed to be novel.

The frequency regions in which imaging optics can be used are limited at the low end by the length of acoustic wave the lens is required to image. FIG. 13 gives the length of a surface wave device as a function of frequency. A device 2,000 cycles long on fused quartz at 3 mm. per microsecond has been assumed. This length would permit two 1,000 cycle long signals to pass each other. The length becomes excessive at low frequencies. In the region below 20 MHz., magnetic torsional delay line methods are more convenient.

Imaging optics appear most useful above approximately 50 MHz. unless shorter delays are used. The methods which do not use imaging optics would probably be limited to frequencies below 30 MHz. This number, however, is very sensitive to the achievable surface wave amplitude and to the spacing between the modulating surfaces.

The condition of a zero-thickness acoustic region, while unattainable, is very closely approximated in the embodiments shown, because the spacing between the two prisms is only a tenth of an optical wavelength. Therefore, the problem of a thick modulating region is avoided. However, through the two successive interaction cells in the embodiments of FIG. 11 are close to each other they are not in contact. The imaging optics in the embodiment of FIG. 12 avoid this problem. Hence the embodiment of FIG. 12 would be preferred for applications having very high performance requirements, while the embodiments of FIG. 11 would be used in applications that require a compact sturdy unit.

Even though the thickness of the spacers is very minute, the amplitude of the surface wave generated is only a small fraction of this spacing. With any reasonable power level on any rigid material readily available, particularly at high frequencies, it is extremely difficult to generate a high-amplitude surface wave, or more than, say, one-hundredth of an optical wavelength. The ultimate limitation involves the strength of the material of the prism material itself. The generation of large-amplitude surface waves is one of the prime experimental difficulties faced.

On a piezoelectric surface, White-Voltmer electrodes can be used for generating surface waves.

On surfaces other than piezoelectric or electrostrictive, one must rely on mode conversion from shear or longitudinal waves. The wedge transducer and the Sokolenski comb are the two most common examples of this technique. Both the comb and the electrode pattern structures have low bandwidth because of their periodic structures. In both cases the bandwidth can be increased by going to a coded sequence structure and using a coded delay line to preprocess the input signal.

The wedge transducer is simpler than the coded-foot transducer and is inherently broadband. It does, however, impose tight tolerances and some difficult materials constraints. For efficient mode conversion the projection of the bulk wave on the surface must match the surface wave cycle. If one starts with a longitudinal wave, it is then required that a wedge material whose longitudinal (fastest) velocity is slower than the Raleigh (slowest) velocity of the substrate be used. If a good match to the transducer is also required, one is forced to use rather exotic materials such as thallium bromoiodide or single-crystal tellurium. Such materials are generally expensive, difficult to fabricate, and toxic.

The materials problems are much simpler if one starts with a shear wave, since the velocity difference is smaller. In this case one could match to fused quartz with a wedge of dense flint glass. Use of shear waves, however, introduces the problem of forming a good bond between the transducer and the wedge material.

Figure 14:
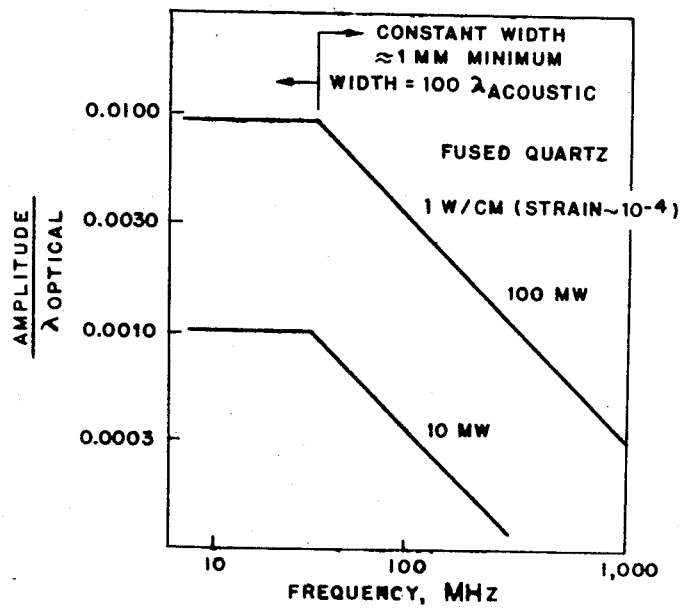
FIG. 14 is a graph showing the dependence of a surface-wave amplitude on the frequency and power density.

Since the achievable surface wave amplitude is a major limiting parameter it is interesting to look at its frequency and power dependence.

$$\text{Power} \propto wc^2fd^2$$
$w=$Width of Surface Wave
$c=$Surface-wave Velocity
$f=$Frequency
$d=$Amplitude The two curves of FIG. 14 show the frequency dependence at power levels of 10 and 100 milliwatts. The sharp bend in these curves results from a change in the ground rules under which they are defined. The flat portions of these curves result from an assumed beamwidth of 100 wavelengths. In this region the increase in power density with frequency due to the narrower beam compensates for the frequency dependence of surface deflection at constant power. The sloping portion of the curves results from an assumed minimum beamwidth of one millimeter.

For a constant power and constant beamwidth the strain in the material will increase with frequency since the power will be concentrated in a thinner layer.

Figure 15A:
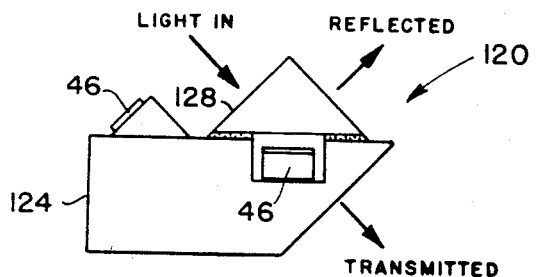
FIG. 15 is a diagrammatic view showing a means of using two surface waves to scan a two-dimensional region.
Figure 15C:
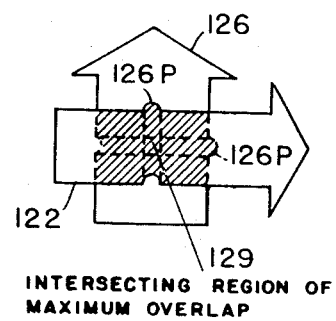
Figure 15B:
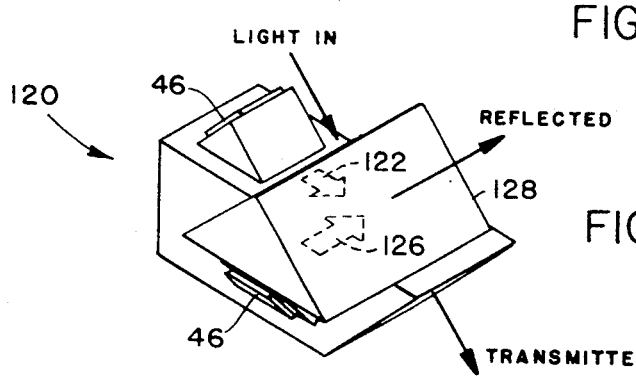

If surface waves are permitted to travel in two directions on the interface as shown in the embodiment 120 shown in FIG. 15, then a two-dimensional region can be scanned. A two-dimensional scan is useful for television scanning or display and for reading data from a picture into a computer.

In embodiment 120, as shown in FIG. 15, the surface wave indicated by arrow 122 travels to the right on the top surface of truncated right rectangular prism 124, whereas surface wave 126 travels on the bottom surface of triangular prism 128, into the plane of the paper in FIG. 15A. It is preferable, but not essential, that one wave be on each surface rather than both on one surface to reduce the surface strain for a given modulation.

FIG. 15C shows diagrammatically a situation in which each surface wave 122 and 126 has a pulse, 122P and 126P, resulting in an intersecting region 129 of maximum overlap. Light transmission is maximum where both surface waves are maximum, at the intersecting region 129 in this instance. Hence if each wave has a sharp maximum and if the two waves are properly synchronized a two-dimensional region may be scanned.

Figure 16:
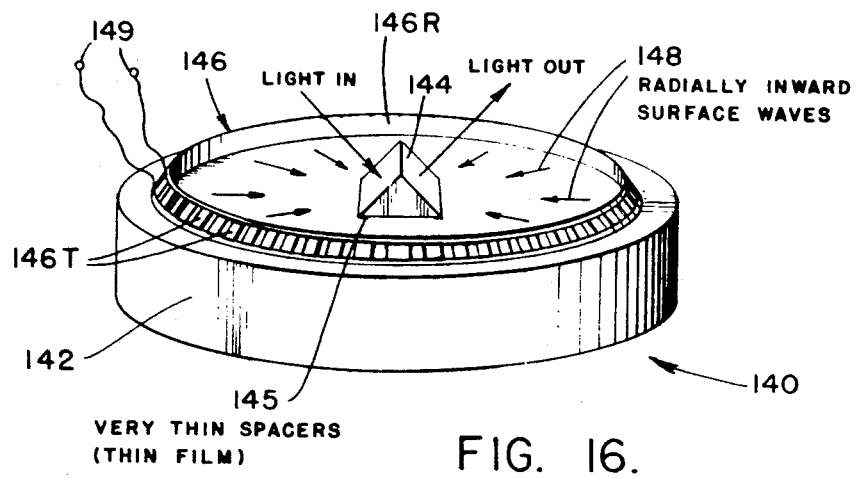
FIG. 16 is a diagrammatic view of an optoacoustic surface-wave device wherein the surface wave is directed radially inwardly into the interface of a prism.

If a temporal modulation of a light beam is required, a focused surface wave can be used as shown in the embodiment 140, as shown in FIG. 16. The surface waves propagate inwardly. Hence, for a fixed power in the wave, the deflection will increase toward the center. The focusing action then permits a large surface deflection to be obtained over the small central region. A device of this sort would be useful for modulating a laser beam.

The embodiment 140 includes a cylindrical prism 142 acting as a base, upon which is mounted, in approximately the center, a triangular prism 144 serving to transmit light, and mounted on spacers 145 having a very small area so as to not obstruct the surface wave. Instead of the simple triangular-wedge type transducer 46 of the previous embodiments, a much more complex transducer arrangement 146 is used consisting of many transducer plates 146T mounted on a ring 146R, of the same material as the prism base for the wedge-type transducer 46. The circular array of transducers 146T directs surface waves indicated by arrows 148 toward the triangular prism 144 mounted on the base 142.

Instead of the single transducer ring 146R having many transducer plates 146T, conventional wedge-type transducers 46 may be used, mounted on the cylindrical prism 142 in a circular array so as to direct individual surface waves 148 radially inwardly.

In a parallel connection of the leads 149, as shown in FIG. 16, one lead is connected to all the bottom electrodes of transducer 146, and the other lead is connected to the top electrode. The electroded surfaces are not shown but would cover most of the two opposite largest surfaces of each transducer.

However, if for some reason it were desirable or necessary to drive them from a high-impedance source, they could be connected in series. Since the individual wedge-type transducer normally has a fairly high input impedance, an array of them would normally be connected in parallel in order to reduce the effective input impedance.

For convenience, one of the electrode leads 149, the one which makes contact with the bottom electrode of each transducer plate 146T, may simply be in the form of a printed circuit deposited on the prism ring 146R.

It should be noted that all of the examples given thus far, except that shown in FIG. 15, involve one-dimensional signals. A major advantage of optical methods is the ability to handle two-dimensional information. Suppose for example that in imaging one cell onto the second, one deliberately introduces some distortion. In particular, assume that one rectangular region is taken, distorted into a trapezoid and projected on the second rectangular region.

As an example, and referring back to FIG. 12, therein is shown a left optical interaction cell imaging a collimated light beam 101 onto a right optical interaction cell, both cells including prisms 42 and 54. A slight keystone distortion may be introduced into the afocal optical system, for example, by tilting the left interaction cell about an axis perpendicular to the plane of the drawing or superimposing a cylindrical curvature upon lens 104, or tilting it. If this distorted image is then transmitted to the right interaction cell, there results a change in scale in one dimension of the image.

Figure 17:
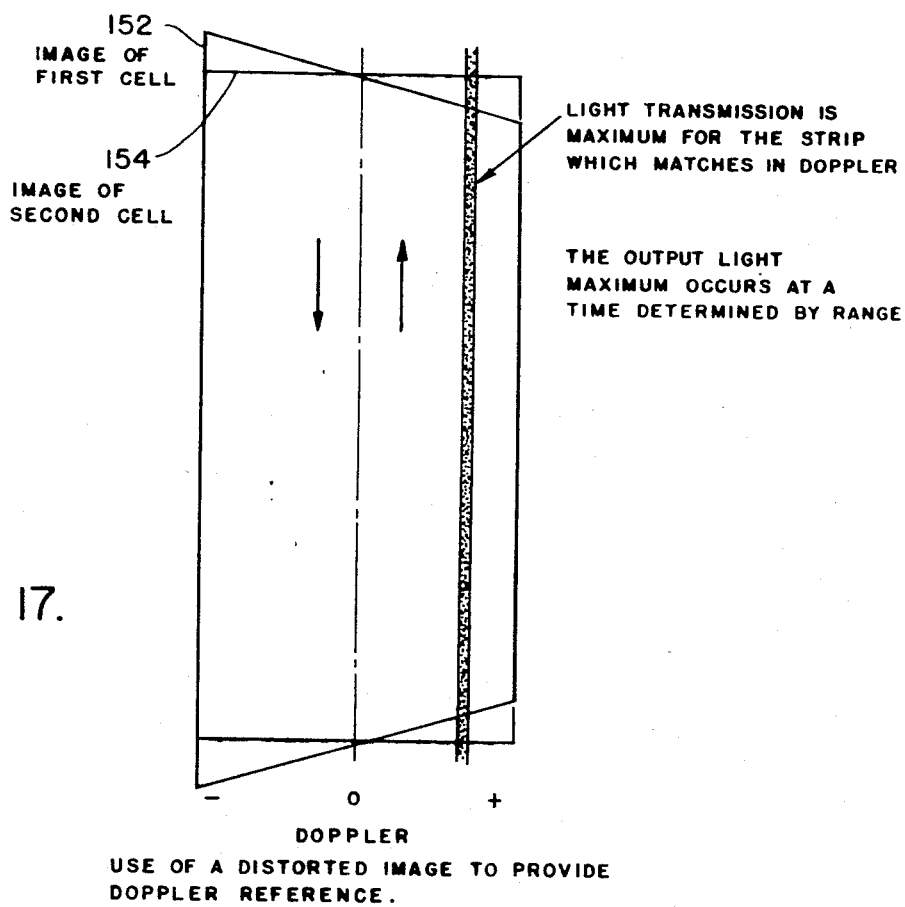
FIG. 17 is a diagrammatic view showing the use of a distorted image to provide doppler reference.

Use may be made of such a distorted image to provide a doppler reference, as shown diagrammatically in FIG. 17.

When a signal is reflected off a moving target, the frequency of the returned signal is increased if the target is approaching the transmitter and decreased if the target is moving away. From a time standpoint, this amounts to a compression or an expansion of the signal in time.

In FIG. 17, use is made of keystone distortion to provide a scale change in the image 152 of the first cell, for example, the left-hand optical interaction cell of FIG. 12. When this distorted image 152 is projected upon the undistorted image 154 from the second cell, for example, the right-hand optical interaction cell of FIG. 12, the undistorted transmission may be compared with the distorted transmission. Distance along the surface of one of the interaction cells corresponds to time, as does the image of one of the surfaces. Therefore, expanding or compressing the image is equivalent to a doppler transformation. A doppler shift causes a scale change across the whole image. Hence the best match will occur for that strip in which the doppler distortion is canceled by the optical distortion.

In FIG. 17, the compression and expansion varies as a function of distance across the figure. For the various narrow regions, for example, as viewed through narrow slits, light transmission would be at a maximum for that slit which matches in doppler. This permits tracking for a number of dopplers simultaneously.

Although the other direction in FIG. 17 does correspond to range, this does not provide a range-doppler plot since light transmission will be maximum for the entire strip of correct doppler at a time determined by range.

The number of separate dopplers which can be measured simultaneously is dependent on the minimum observed width which will give an adequate signal to noise ratio. This again is dependent on the amplitude of surface wave which can be generated.

Obviously many modifications and variations of the present invention are possible in the light of the above teachings. It is therefore to be understood that within the scope of the appended claims the invention may be practiced otherwise than as specifically described.

What is claimed is:

1. An optoacoustic surface-wave device comprising:
   a transparent body having at least one flat face adapted to receive a beam of light which is incident first to the body and then to the flat face;
   an interaction element having a flat surface which is adjacent to the face of the transparent body, the two adjacent surfaces constituting an interface;
   means for separating the two surfaces at the interface, the two surfaces making contact with the separating means, and
   means for producing an acoustic surface wave on at least one of the surfaces of the interface, with the result that any beam of light incident upon either surface at the interface is modulated by the acoustic surface wave.

2. An optoacoustic surface-wave device according to claim 1, wherein:
   the transparent body is a prism having a triangular cross section, adaptable for receiving the beam of light in the plane of the cross section.

3. An optoacoustic device according to claim 2, wherein the cross section of the prism is that of a right isosceles triangle, the largest lateral face, the hypotenuse, constituting the flat face, with the beam of light entering the prism generally perpendicularly to one of the other lateral faces; and
   the means for separating the two surfaces comprising at least one spacer, the spacer disposed on the hypotenuse surface of the prism or the adjacent surface of the interaction element, the thickness of the spacer being approximately one-tenth the wavelength of the beam of light.

4. An optoacoustic device according to claim 3, wherein the interaction element comprises a second prism.

5. An optoacoustic device according to claim 4, wherein the means for producing an acoustic surface wave comprises at least one transducer.

6. An optoacoustic device according to claim 5, wherein the transducer is a wedge-type transducer.

7. An optoacoustic device according to claim 5, further comprising:
   at least one photodetector, for demodulating the light either reflected off or transmitted through the interface.

8. An optoacoustic device according to claim 7, wherein the second prism is substantially identical to the first prism, with the two hypotenuse surfaces adjacent to each other, the combination of the two prisms and the spacers which separate them constituting an optical interaction cell.

9. An optoacoustic device according to claim 8, wherein one of the hypotenuse surfaces of the interface has a coded pattern on it,
   the surface wave being generated parallel to the coded pattern, and the transducer is mounted on the uncoded hypotenuse surface.

10. An optoacoustic device according to claim 9, wherein the coded pattern is an etched pattern.

11. An optoacoustic device according to claim 7, wherein the second prism comprises a light-absorbing plate.

12. An optoacoustic device according to claim 11, further comprising:
   a pane of clear glass disposed between and making contact with the light-absorbing plate and spacers on the first prism.

13. An optoacoustic device according to claim 7, wherein the second prism comprises a pane of clear glass; and further comprising
   a light-absorbing surface disposed on that surface of the pane remote from the hypotenuse surface of the first prism.

14. An optoacoustic device according to claim 13, wherein the light-absorbing surface constitutes an antireflective coating.

15. An optoacoustic device according to claim 8, further comprising
   a third prism having the shape of a right parallelepiped, disposed between the first and second prisms, with two of its lateral faces adjacent to and of the same shape as the two hypotenuse surfaces of the two prisms, the spacer separating the first or second prism from the third prism;
   a second spacer separating the other of the first or second prisms from the third prism; and wherein
   the means for producing an acoustic surface wave comprises two transducers, one on each hypotenuse surface of the triangular prisms, each generating a surface wave perpendicular to the plane of the triangular cross section of the prisms and in opposite directions, with the result that a beam of light incident on one of the nonhypotenuse lateral faces of one of the prisms is modulated by each of the surface waves; and
   a photodetector for detecting the modulation in the modulated light beam.

16. An optoacoustic device according to claim 15, wherein the photodetector is so disposed as to capture an emergent beam of light which is incident upon one of the lateral faces of the first triangular prism, traverses all three prisms and emerges from one of the lateral faces of the second triangular prism.

17. An optoacoustic device according to claim 15, wherein the photodetector is so disposed as to capture an emergent beam of light which is incident upon one of the lateral faces of the third triangular prism, reflected off both interfaces, and emerges from one of the lateral faces of the third prism.

18. An optoacoustic device according to claim 8, further comprising
   a pair of lenses for an afocal lens system spaced a distance of $2f$ apart, where $f$ is the focal length of each of the lenses;
   a transform plane with zero-order stop, located halfway between the two lenses;

the optical interaction cell disposed a distance of 2 $f$ from the transform plane, so oriented that a beam of light reflected off its interface passes through the afocal lens system;

a second optical interaction cell located symmetrically with respect to the first-named optical interaction cell on the opposite side of the transform plane;

a focusing lens, located near one of the lateral faces of the second interaction cell, for focusing any beam of light traversing the afocal lens system and reflected off the interface of the second optical interaction cell; and a photocell, aligned with the beam of light from the focusing lens, for detecting the light focused by the focusing lens.

19. An optoacoustic device according to claim 18, wherein the zero-order stop comprises an opaque spot in the order of one-sixteeth inch diameter on a pane of glass located at the transform plane.

20. An optoacoustic device according to claim 7, wherein the second prism comprises a truncated right parallelepiped, upon whose largest surface is disposed the hypotenuse surface of the first-named prism, the two surfaces constituting an interface;

the means for generating a surface wave comprises two transducers, one mounted on the hypotenuse surface of the first prism in a manner to generate a surface wave at a right angle to the triangular cross section of the first prism; and the other mounted on the largest surface of the parallelepiped and generating a surface wave on the same interface at right angles to the other surface wave.

21. An optoacoustic surface-wave device comprising:

a base, preferably in the form of a flat cylindrical prism, capable of propagating acoustic surface waves;

a triangular, transparent, prism, disposed at the center of the base, whose hypotenuse surface is adjacent to one of the flat surfaces of the base;

means for separating the prism from the base; a plurality of transducers mounted upon the base in a circular array, each transducer capable of projecting a surface wave toward the center of the base; and means for synchronizing the projection of the surface waves toward the center of the base, thereby modifying the magnitude of the resultant surface wave.

22. An optoacoustic surface-wave device according to claim 21, wherein each transducer is a wedge-type transducer comprising a transducer plate mounted on a triangular prism.

23. An optoacoustic surface-wave device according to claim 22, wherein the plurality of transducer plates are arranged in a regular array about a single transducer base having the shape of a ring and a triangular cross section.